US011285861B1

(12) United States Patent
Fruechtenicht

(10) Patent No.: US 11,285,861 B1
(45) Date of Patent: Mar. 29, 2022

(54) HIGHLY MANEUVERABLE STEERABLE RIDING DEVICE FOR TRANSPORTING LOADS

(71) Applicant: Robert Fruechtenicht, Fairfax, CA (US)

(72) Inventor: Robert Fruechtenicht, Fairfax, CA (US)

(*) Notice: Subject to any disclaimer, the term of this patent is extended or adjusted under 35 U.S.C. 154(b) by 210 days.

(21) Appl. No.: 16/661,678

(22) Filed: Oct. 23, 2019

Related U.S. Application Data

(60) Provisional application No. 62/750,197, filed on Oct. 24, 2018.

(51) Int. Cl.
*B62D 51/00* (2006.01)
*B60P 9/00* (2006.01)
*B62D 51/02* (2006.01)
*B60L 50/50* (2019.01)

(52) U.S. Cl.
CPC ............. *B60P 9/00* (2013.01); *B60L 50/50* (2019.02); *B62D 51/005* (2013.01); *B62D 51/02* (2013.01); *B60L 2200/40* (2013.01)

(58) Field of Classification Search
CPC ........ B60P 9/00; B60L 50/50; B60L 2200/40; B62D 51/02; B62D 51/005
See application file for complete search history.

(56) References Cited

U.S. PATENT DOCUMENTS

| 3,316,993 | A | | 5/1967 | Weitzner | |
|---|---|---|---|---|---|
| 3,485,314 | A | * | 12/1969 | Herr | B62D 51/005 180/19.1 |
| 3,834,726 | A | * | 9/1974 | Hobza | B62B 5/0026 280/87.041 |
| 4,096,920 | A | * | 6/1978 | Heyn | B62D 51/02 180/11 |
| 4,249,633 | A | * | 2/1981 | Dunbar | B60G 9/02 180/24.02 |
| 4,538,695 | A | | 9/1985 | Bradt | |
| 4,874,055 | A | * | 10/1989 | Beer | B62K 5/027 180/19.2 |
| 5,004,251 | A | * | 4/1991 | Velke | B62D 63/061 280/32.7 |
| 5,350,077 | A | * | 9/1994 | Nezu | B61G 1/283 180/168 |
| 5,718,534 | A | * | 2/1998 | Neuling | B60K 17/043 180/11 |
| 5,810,371 | A | * | 9/1998 | Velke | B60D 1/143 280/32.7 |

(Continued)

FOREIGN PATENT DOCUMENTS

JP 5011293 B2 1/2012

*Primary Examiner* — Jacob B Meyer
(74) *Attorney, Agent, or Firm* — Christopher Pilling

(57) ABSTRACT

A riding device for transporting a load and a human with three sets of laterally spaced wheels, and a foot stand assembly suspended above the riding surface, wherein a user may stand on the foot stand assembly and steer the riding device. The device comprises a first set of swivel caster wheels, a second set of drive wheels, and a third set of foot stand assembly wheels connected with a frame and load bearing platform. The riding device preferably uses a battery as a power source, and is sized to fit through doorways, hallways, and into elevators so that it may be used inside or outside to transport tools or other equipment.

13 Claims, 3 Drawing Sheets

(56) References Cited

U.S. PATENT DOCUMENTS

| | | | | |
|---|---|---|---|---|
| 5,927,730 | A * | 7/1999 | Sattler | B62B 5/002 280/47.131 |
| 5,947,505 | A * | 9/1999 | Martin | A01D 34/82 280/493 |
| 6,390,216 | B1 * | 5/2002 | Sueshige | A63B 55/61 180/65.51 |
| 6,422,634 | B2 * | 7/2002 | Lundh | B62B 9/28 280/32.7 |
| 6,443,252 | B1 * | 9/2002 | Andes | A61G 5/10 180/65.1 |
| 6,488,291 | B1 * | 12/2002 | Bellis, Jr. | B62D 49/065 280/32.7 |
| 6,651,993 | B1 * | 11/2003 | Emerzian | B62B 3/008 280/47.17 |
| 6,827,356 | B2 * | 12/2004 | Zhuang | B62B 9/28 280/304.1 |
| 6,907,949 | B1 | 6/2005 | Wang | |
| 7,000,933 | B2 * | 2/2006 | Arling | B62K 11/007 280/204 |
| 7,004,272 | B1 * | 2/2006 | Brown | B60K 1/00 180/65.1 |
| 7,300,061 | B1 * | 11/2007 | Omstead | A01D 67/00 280/32.7 |
| 7,527,285 | B2 * | 5/2009 | Vachal | B62D 51/008 280/32.7 |
| 7,581,737 | B2 * | 9/2009 | Cousin | B62B 9/28 280/32.7 |
| 7,611,155 | B2 * | 11/2009 | Bares | B62D 51/02 280/32.7 |
| 7,699,128 | B1 * | 4/2010 | Strauss | B62B 5/002 180/65.1 |
| 7,735,587 | B1 * | 6/2010 | Stahlnecker | B62B 1/12 180/19.1 |
| 7,743,840 | B2 * | 6/2010 | Hoffman | A01B 45/02 172/22 |
| 7,971,884 | B2 * | 7/2011 | Lundh | B62B 9/28 280/32.7 |
| 7,971,893 | B1 * | 7/2011 | Dunn | A61G 5/045 280/304.1 |
| 8,006,786 | B1 * | 8/2011 | Chapman | A61G 5/1094 180/65.1 |
| 8,113,305 | B1 * | 2/2012 | Flowers | A61G 5/128 180/19.1 |
| 8,196,247 | B2 * | 6/2012 | Fellhauer | A47L 11/40 15/49.1 |
| 8,220,823 | B2 * | 7/2012 | Queen | B62B 9/28 280/650 |
| 8,261,859 | B2 * | 9/2012 | Duehring | B62M 7/14 180/11 |
| 8,276,922 | B2 * | 10/2012 | Lai | B62B 9/28 280/32.7 |
| D673,586 | S * | 1/2013 | Truan | D15/13 |
| 8,371,404 | B2 * | 2/2013 | Boeckler | B62B 1/002 180/65.1 |
| 8,573,625 | B2 * | 11/2013 | Gramme | B62K 27/003 280/401 |
| 8,662,218 | B1 * | 3/2014 | Horn | B62D 61/065 180/19.1 |
| 8,714,582 | B2 * | 5/2014 | Hei | B62B 9/28 280/656 |
| D740,173 | S * | 10/2015 | Treadway | D12/1 |
| 9,272,589 | B2 * | 3/2016 | Yamano | B60D 1/02 |
| D760,809 | S * | 7/2016 | Nicholson | D15/26 |
| 9,669,857 | B1 * | 6/2017 | Rainey | B62B 5/06 |
| 9,809,263 | B2 * | 11/2017 | Mitchell | B62D 51/008 |
| 9,828,014 | B1 * | 11/2017 | Gillespie | E06C 5/00 |
| D845,833 | S | 4/2019 | Asai | |
| 10,703,399 | B2 * | 7/2020 | Ostergaard | B62B 3/008 |
| 10,751,232 | B1 * | 8/2020 | Ilao | A61G 5/1051 |
| 10,913,479 | B1 * | 2/2021 | Cardentey | B62B 7/042 |
| 11,000,432 | B2 * | 5/2021 | Katsura | A61G 5/10 |
| 2001/0033069 | A1 * | 10/2001 | Ivers | B62B 9/28 280/648 |
| 2007/0114738 | A1 * | 5/2007 | Jones | B62B 5/087 280/32.7 |
| 2007/0245488 | A1 * | 10/2007 | Zimbalista | A61G 1/0281 5/86.1 |
| 2008/0041644 | A1 * | 2/2008 | Tudek | B62B 5/0033 180/65.1 |
| 2011/0000731 | A1 * | 1/2011 | Boeckler | B62B 5/0026 180/220 |
| 2015/0034402 | A1 * | 2/2015 | Dourado | A45F 3/04 180/181 |
| 2017/0106890 | A1 * | 4/2017 | Johnson | B62B 3/04 |
| 2018/0057080 | A1 * | 3/2018 | Mitchell | B62D 51/008 |
| 2018/0304912 | A1 * | 10/2018 | Johnson | B62B 3/008 |
| 2018/0346007 | A1 * | 12/2018 | Fielder | B62D 51/005 |
| 2019/0038486 | A1 * | 2/2019 | Sato | A61G 5/10 |
| 2019/0269566 | A1 * | 9/2019 | Katsura | A61G 5/042 |
| 2019/0298593 | A1 * | 10/2019 | Katsura | A61G 5/04 |
| 2020/0269893 | A1 * | 8/2020 | Johnson | B62B 3/002 |
| 2021/0070339 | A1 * | 3/2021 | Delgatty | B60R 25/24 |

* cited by examiner

HIGHLY MANEUVERABLE STEERABLE RIDING DEVICE FOR TRANSPORTING LOADS

CROSS REFERENCE TO RELATED APPLICATION

This application claims the benefit of U.S. provisional patent application No. 62/750,197, filed Oct. 24, 2018, which is incorporated herein in its entirety.

STATEMENT REGARDING FEDERALLY SPONSORED RESEARCH

Not applicable.

NAMES OF THE PARTIES TO A JOINT RESEARCH AGREEMENT

Not applicable.

STATEMENT REGARDING PRIOR DISCLOSURES

Not applicable

BACKGROUND OF THE INVENTION

Many business campuses, university campuses, cities, towns, and others are attempting to reduce the use of internal combustion engines to power vehicles used on-site. Many sites may not have formal roads, but may have paths, sidewalks, or hallways connecting various buildings within a site. Likewise, many residential facilities or other buildings often need repairs within a building.

The invention relates to maneuverable devices for transporting equipment, tools, or other items, and a user, along roads, pathways, hallways, in elevators, or in other situations where there may be tight corners and narrow accessways, and where it may be undesirable to use an internal combustion engine.

BRIEF SUMMARY OF THE INVENTION

The invention comprises a riding device that is capable of carrying heavy loads and a user over a variety of surfaces, with a high degree of maneuverability allowing a user to steer the device around tight corners, up and down ramps, into and off of elevators, along hallways and narrow pathways, all while transporting loads. This is especially useful for workers at university or business campuses that need to transport equipment around the campus to perform their work.

The invention comprises at least one load-bearing platform connected with a frame. A first set of laterally spaced swivel caster wheels are connected with the front end of the frame. A second set of laterally spaced drive wheels are connected with the back end of the frame. In a preferred embodiment, the frame width is preferably sized to connect with the laterally spaced wheels and allow the entire device to fit through an internal doorway. The frame length may be of any length desired.

In a preferred embodiment, the frame is connected with a load bearing platform that supports a power source to provide power to the device. The power source may preferably be a battery, but could be solar powered, an internal combustion engine, or any power source known in the art. In a preferred embodiment the power source is connected with two motors, and each motor powers one drive wheel in the second set of wheels, allowing movement and turning. In other embodiments, a single motor may be connected via a drivetrain to each wheel in the second set of laterally spaced wheels, to allow movement and turning.

The frame may have essentially any shape or structure desired. In some embodiments, the frame supports attachments for holding tools, equipment, or any other desired items. As non-limiting examples, the frame may support additional platforms, an equipment box, a tool box, an industrial-sized laundry basket, a wine cart, or any other load that can fit on the device. The frame may be embellished with additional accessories, as needed. As non-limiting examples, headlights, flashing lights, or specialized racks for holding tools may be added to the device.

A third set of laterally spaced wheels extends back from the back end of the frame, and behind the second set of laterally spaced wheels. The third set of laterally spaced may be swivel caster wheels, or regular wheels.

A foot stand is positioned between the third set of laterally spaced wheels and behind the frame. The foot stand is connected with the frame. Each wheel in this third set of laterally space wheels is connected with, and extends from, the back of the frame, one from the back left side and the other from the back right side. The foot stand is suspended above the level of the riding surface, and is capable of supporting the weight of a human while so suspended.

The frame may include vertical support members. In a preferred embodiment, the vertical support members are connected with hand grips, allowing a user to grip the frame. A steering mechanism may be connected with the frame. The handgrips, foot stand, and steering mechanism are disposed so that a user may stand on the foot stand, grip the handgrips of the frame, and steer the device. This allows for accurate steering, while also allowing for transport of loads to areas that are inaccessible by standard motorized vehicles.

BRIEF DESCRIPTION OF THE SEVERAL VIEWS

DETAILED DESCRIPTION OF THE INVENTION

The invention comprises a riding device that is capable of carrying heavy loads and a user over a variety of surfaces while providing a high degree of maneuverability. The embodiments described below are set forth as examples, and not as a limitation on the scope of the invention.

Riding device 100 comprises frame 101, three sets of laterally spaced wheels, a power source, at least one motor, a steering control mechanism, and a foot stand assembly. Frame 101 may be of any shape as needed to accommodate the power source, at least one motor, and any frame structure additions as needed for carrying tools or other items.

The width of the device is preferably a width that fits through a standard internal doorway. It is apparent that the width of riding device 100 may be any width as needed to accomplish the goal of allowing riding device 100 to move in an unobstructed manner. Thus, if riding device is used along pathways that are wider than a standard internal doorway, the width of riding device may be wider than the width of a standard internal doorway.

Figure 1:
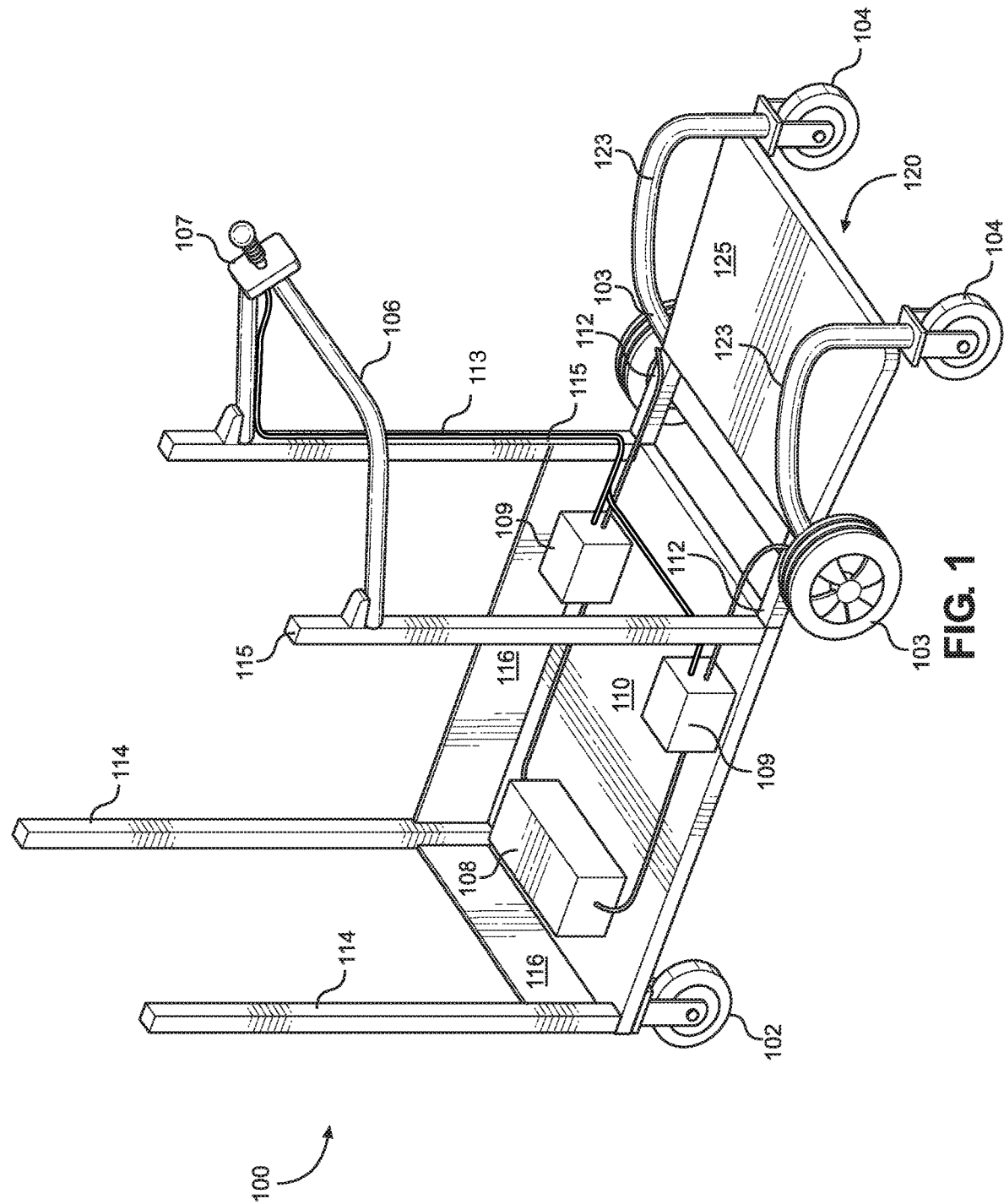
FIG. 1 is a perspective view of an embodiment of the invention.
Figure 2:
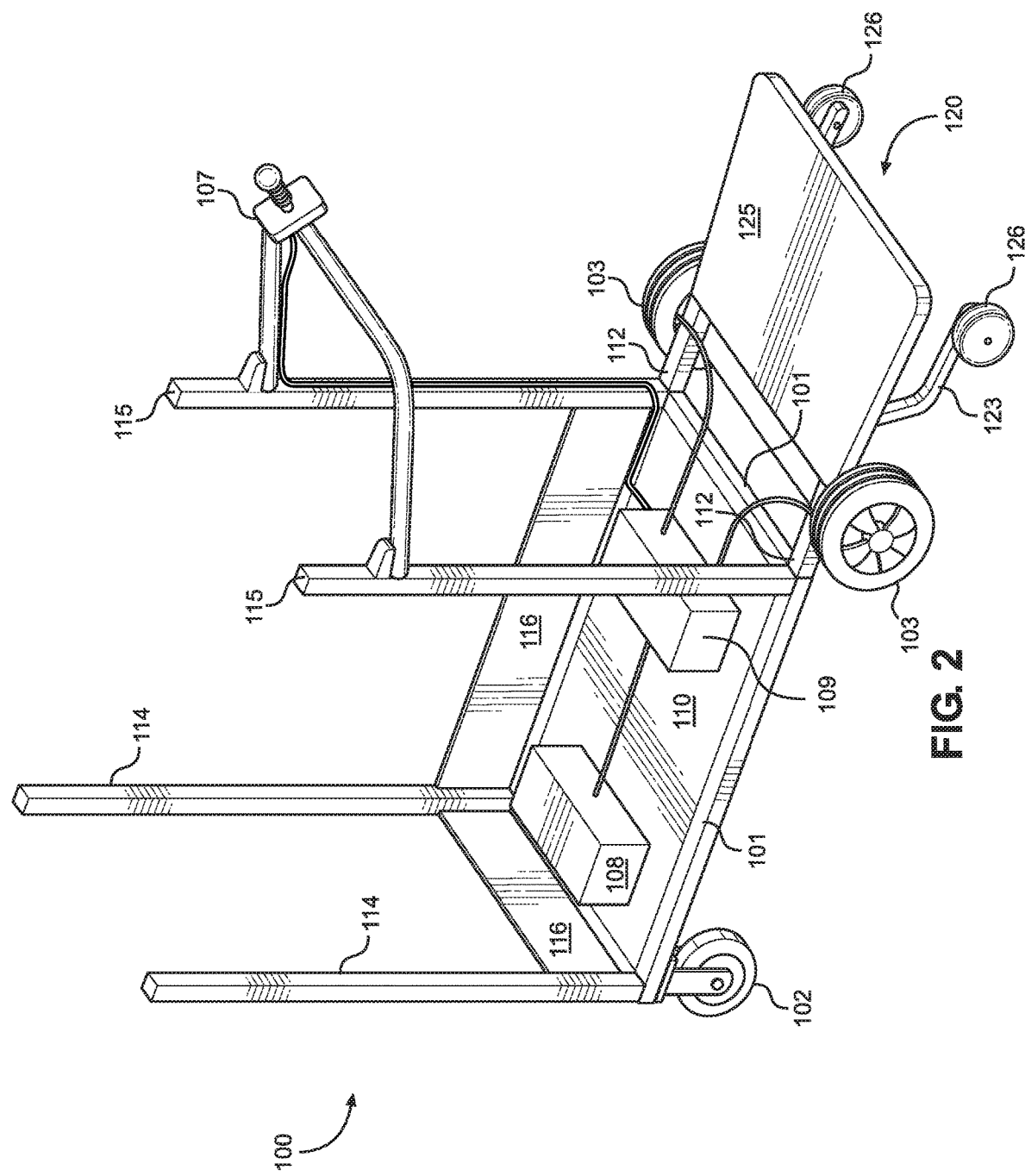
FIG. 2 is a perspective view of an embodiment of the invention.

In some embodiments frame 101 and platform 110 may be integrated so that platform 100 comprises part of frame 101 as shown in FIG. 1. In other embodiments, frame 101 may be comprised of up to four frame members 101 connected at 90 degree angles to form a rectangle or square as shown in FIG. 2. In this embodiment there is a left side frame member 101, a right side frame member 101, a front frame member 101, and a back frame member 101. Platform 110 may be supported by frame members 101.

The front end of frame 101 is connected with a first set of laterally spaced swivel caster wheels 102, with a left side swivel caster wheel attached proximate to the front left side of frame 101, and a right side swivel caster wheel attached proximate to the front right side of frame 101.

The back end of frame 101 is connected with a second set of laterally spaced drive wheels 103, with a left side drive wheel is attached proximate to the back left side of frame 101, and a right side drive wheel is attached proximate to the back right side of frame 101. In some embodiments, a set of frame extensions 112 may attach the second set of wheels proximate to the frame. In other embodiments drive wheels 103 may be directly connected with frame 101. Drive wheels 103 may be directly or indirectly attached proximate to the back of frame 101 by any means known in the art.

Foot stand assembly 120 is securely connected with the back end of frame 101 so that foot stand platform 105 is suspended above the level of the riding surface while supporting the weight of a human. The third set of laterally spaced wheels may help suspend and support the foot stand assembly. Foot stand assembly 120 may be directly connected with frame 101. Or, in other embodiments foot stand assembly 120 may be connected with frame 101 by frame extensions 112. Foot stand assembly 120 may be indirectly connected with frame 101 through as many frame extensions 112 as needed or desired. Foot stand assembly may be connected with frame 102 by any means known in the art to securely connect foot stand assembly 120 with frame 101 to suspend foot stand platform 105 above the riding surface while supporting the weight of a human.

Frame 101 may further comprise a left front vertical frame member 114 and a right front vertical frame member 114. Front vertical frame members 114 may provide structural support to the device and may be used to support any attachments or equipment that may be carried on the riding device 100.

Frame 101 may further comprise a left back vertical frame member 115 and a right back vertical frame member 115. Back vertical frame members 115 may provide structural support to the device and may be used to support any additional frame structures or equipment that may be carried on riding device 100.

At least one back vertical frame member 115 is connected with hand grip 106. Hand grip 106 may be a single unit as shown, or may be two separate units, one for each hand. It is apparent that hand grip 106 may be of any shape or structure sufficient to provide a place for human hands to grip and hold onto riding device 100.

In a preferred embodiment at least one back vertical member 115 is connected with steering control mechanism 107. Steering control mechanism 107 transmits steering input to drive wheels, via motors 109. In some embodiments, steering control mechanism 107 transmits steering input to motors 109 through connection wires 113. In other embodiments, steering control mechanism 107 transmits steering input to motors 109 through a wireless connection. In a preferred embodiment a first motor 109 is connected with a first drive wheel 103, and a second motor 109 is connected with a second drive wheel 103. Steering control mechanism 107 transmits steering input to motors 109, and in response each motor 109 transmits force to rotate one drive wheel 103. Each motor 109 may transmit force to one drive wheel 109 by a mechanical connection, or by a wired connection, or by a wireless connection. A user may steer riding device 100 by manipulating steering control mechanism 107.

The back end of frame 101 may comprise a left vertical support member 115 and a right vertical support member 115. Vertical support members 115 may comprise part of the support frame. Steering control mechanism 107 may be connected with one or more of these vertical members, allowing a user to stand on foot stand assembly 120, grip hand grip 106, and steer the device by providing steering input to steering control mechanism 107. This allows for highly maneuverable and accurate steering, while also allowing for transport of loads to areas that are inaccessible by standard motorized vehicles.

Steering control mechanism 107 is manipulated by a user. After receiving input from the user, steering control mechanism 107 transmits steering input to the drive wheels to steer the device. In a preferred embodiment, steering input is transmitted from steering control mechanism 107, by connection wires 113, to at least one motor 109. Each motor 109 is connected with and provides rotational force to one drive wheel 103. In other embodiments, steering control mechanism 107 sends steering input to a drivetrain, connected with each wheel.

In some embodiment, the steering mechanism is a joystick that transmits steering input from the joy-stick to motors 109. In other embodiments steering mechanism 107 may be a steering wheel, or any other device known to permit steering.

Frame 101 is connected with at least one load-bearing platform 110. Platform 110 and frame 101 each have a front end, a back end, a left side, a right side, a length, and a width that correspond with each other. Platform 110 and frame 101 each have a depth that may or may not correspond with each other. At least one platform 110 may be positioned at any vertical height. Platform 110 may be supported by vertical frame members 114 and 115, or may be integrated with frame 101. There may be more than one platform 110 at different heights. At least one platform 110 is a load-bearing platform that is preferably used to support power source 108 and at least one motor 109. It is apparent that power source 108 and motors 109 may be positioned elsewhere on the device.

In a preferred embodiment, each wheel in the first set of laterally spaced wheels is a swivel caster wheel, as shown in FIG. 1 (herein called "caster wheel(s)"). Each caster wheel is capable of rotating 360 degrees while supporting a load, providing a high level of maneuverability so that riding device 100 may steer around tight corners. It is apparent that regular wheels may be used in the first set of laterally spaced wheels, however, this will decrease the maneuverability of the device.

A second set of laterally spaced wheels is connected with the back end of the frame. In a preferred embodiment, these wheels steer or turn (herein called "drive wheel(s)"). In a preferred embodiment, horizontal frame members 112 may extend rearward from the back end of the frame 101 and connect with the wheels 103, as shown in FIG. 1. A left horizontal frame member 112 connects with left drive wheel 103, and right horizontal frame member 112 connects with right drive wheel 103.

In other embodiments, the second set of laterally spaced wheels may be connected directly with the rear end of frame 101, or connected directly with platform 110. The second set of wheels are preferably regular wheels, rather than caster wheels. However, caster wheels may optionally be used for the second set of laterally spaced wheels.

The device further comprises a third set of set of laterally spaced wheels. These wheels may be swivel caster wheels, capable of swiveling 360 degrees, as shown in FIG. 1. Or they may be regular wheels, as shown in FIG. 2.

Riding device 100 is powered by power-source 108. Power-source 108 is connected with motors 109 to provide power to run motors 109. In some embodiments, power-source 108 is a battery. This is preferable on campuses or indoors where internal-combustion engines are prohibited or unwanted. In other embodiments, riding device 100 may be powered by an internal combustion engine, or solar power, or by any other means known to provide power to a motor. Power source 108 provides power to motors 109, which in turn transmit force to rotate drive wheels 103 to move and steer the riding device. There may be one or two motors 109.

Power source 108 and motors 109 are preferably positioned on, and supported by, load-bearing platform 110. However, power source 108 and motors 109 do not have to be located on platform 110 and may be located elsewhere on the device.

In a preferred embodiment one motor 109 is connected with one drive wheel 103, so that there are two motors 109 in riding device 100. Riding device 100 moves when at least one motor transmits force to rotate the connected drive wheel. Rotation of at least one drive wheel causes the riding device to move. Riding device moves forward when both motors 109 rotate both drive wheels 103 in a forward direction. Riding device 100 moves backwards when both motors 109 rotate drive wheels 103 in a backward direction. Steering is accomplished by having a first motor 109 power a first drive wheel to rotate forward, while a second motor 109 powers a second drive wheel to rotate backward, causing riding device to turn in a first direction. Reversing this, and having the first motor 109 power the first turning wheel 103 to rotate backward, while the second motor 109 powers the second turning wheel 103 to rotate forward causes the riding device to turn in a second direction. This provides the ability to move and to steer the device.

The third set of laterally spaced wheels 104 may connect with the back of frame 101 through at least one set of extensions 123, as shown in FIG. 1, or they may connect with foot-stand assembly 120, or they may be securely connected with frame 101 or foot stand assembly 120 by any means known in the art. The third set of wheels provides additional stability to the device, and helps prevent the device from tipping, or falling backward when going up a ramp, over a bump, or on an inclined riding surface. The third set of wheels also may support foot stand assembly 120.

One wheel in this third set of laterally space wheels is a left wheel and is positioned proximate to the left side of foot stand platform 125, and a second wheel is right wheel and is positioned proximate to the right side of foot stand platform 125.

The third set of wheels 104 is positioned behind the second set of wheels. The order of the sets of wheels, from the front of the device to the back of the device, is the first set of wheels (the caster wheels), second set of wheels (the drive wheels), and the third set of wheels (the foot stand wheels).

The foot stand assembly 120 is preferably positioned between the third set of laterally spaced wheels 104. The foot stand assembly is comprised of a foot stand platform 105 that has a front end, back end, left side, and right side, a length, a width, and a depth. The width of the foot stand platform 105 is preferably sized to fit between the foot stand wheels 104, and to accommodate the feet of a human. The front end of the foot stand is proximate to the back end of frame 101. The foot stand platform 105 is securely connected with frame 101 so that foot stand 105 is suspended above the riding surface. The foot stand is capable of supporting the weight of a human while so suspended.

Load bearing platform 110 may support a battery 108 or other power source to power to the device, as shown in FIG. 1. The platform may further support at least one and preferably two motors 109. Platform 110 has a perimeter defined by a width, a length, a front end, a back end, left side, and a right side. Platform 110 may be connected with at least one vertical wall 116, wherein the vertical wall 116 is connected with at least one edge of the perimeter. Or there may be up to four vertical walls 116, each wall connected with one edge of the perimeter of platform 110. The vertical wall or walls 116 may be used retain items, and to provide additional structural support.

The width of the load-bearing platform is sized to connect with the laterally-spaced wheels, and fit through any structures or along any pathways as needed. The platform length may be of any length desired.

Figure 3:
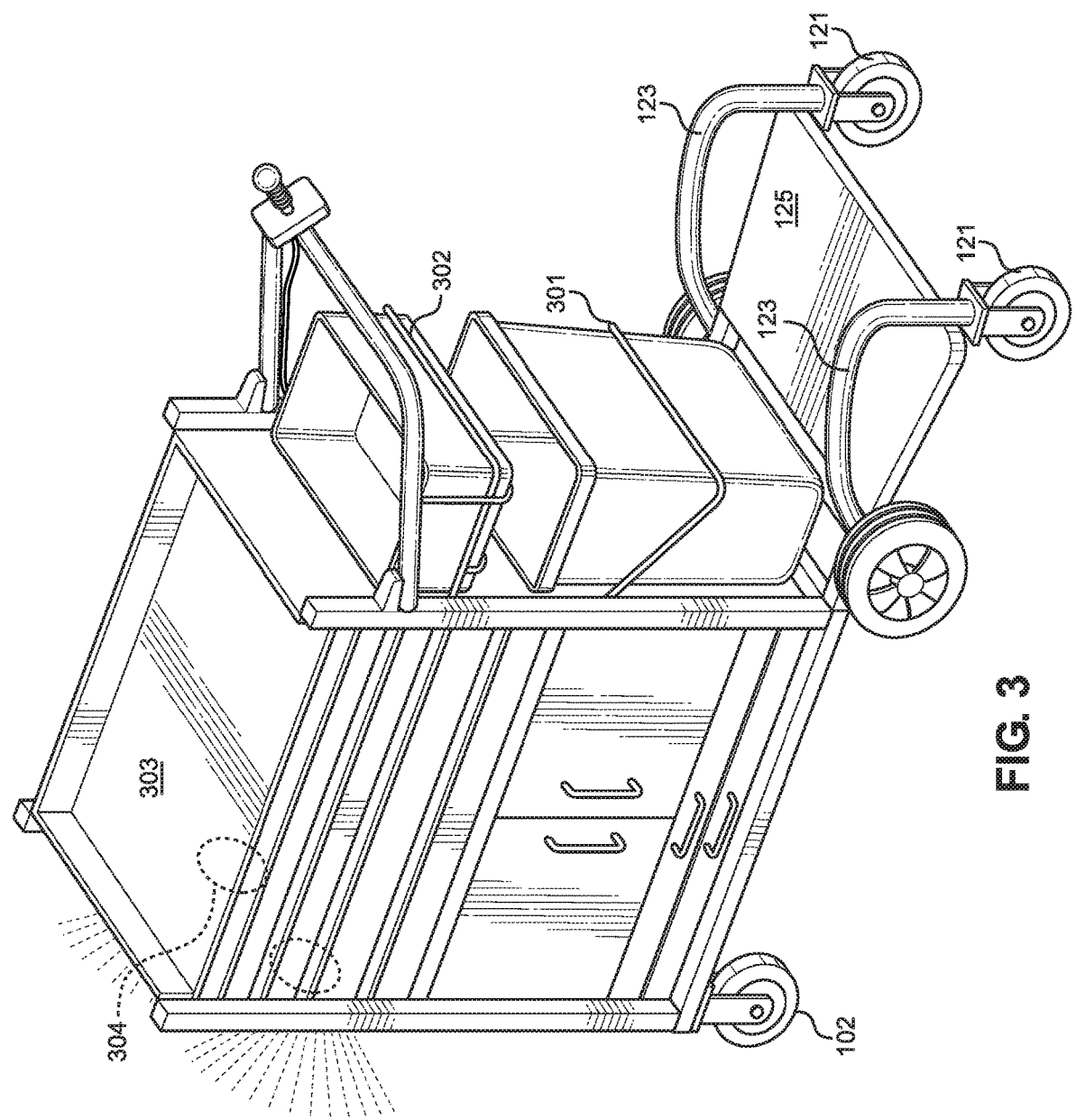
FIG. 3 is a perspective view of an embodiment of the invention with additional exemplary optional features, as non-limiting examples, a tool box, a basket, and a rack for holding items.

The riding device frame 101 and platform 110 may be configured to support tools, equipment, or any other desired items. In one embodiment, as shown in FIG. 3, frame 101 and platform 110 support a tool box. In other embodiments, the platform and frame may support an industrial-sized laundry basket, a wine cart, or any other load that can be sized to fit through a doorway. The frame may have any additions needed. As shown in FIG. 3, the frame may include additional frame structures to support a basket, or for holding other items. As non-limiting examples, additional frame structure 301 and additional frame structure 302 are shown in FIG. 3. Riding device 100 may include headlights 304, flashing lights, turn signals, or any other lighting as needed. It is apparent that riding device may be configured with any additional items or accessories as needed.

It should be understood that the drawings and detailed description are not intended to limit implementations to the particular form disclosed but, on the contrary, the intention is to cover all modifications, equivalents and alternatives falling within the spirit and scope as defined by the appended claims. The drawing figures are representational, and are not necessarily to scale. Certain features or components may be shown in somewhat schematic form and some details of conventional elements may not be shown or described in the interest of clarity and conciseness. As used throughout this application, the word "may" is used in a permissive sense (i.e., meaning having the potential to), rather than the mandatory sense (i.e., meaning must). Similarly, the words "include," "including," and "includes" mean including, but not limited to.

What is claimed is:

1. A riding device for transporting loads and a human comprising:

a frame comprised of a front end member, a back end member, a left side member, and a right side member connected at 90 degree angles to form a rectangular frame base;

a load bearing horizontal rectangular platform integrated with or supported via the rectangular frame base; wherein the frame further comprises a front left vertical frame member, a front right vertical frame member, a back left vertical frame member, and a back right vertical frame member, wherein each vertical frame member extending from corners of the rectangular frame base;

at least one solid vertical wall is connected with a perimeter of the load bearing horizontal platform or attached to two adjacent vertical frame members;

a first set of laterally spaced swivel caster wheels connected with the front end of the frame, wherein a left caster wheel is attached proximate to the front left side of the frame and a right caster wheel is attached proximate to the front right side of the frame;

a second set of laterally spaced drive wheels connected with the back end of the frame, wherein a left drive wheel is attached proximate to the back left side of the frame and a right drive wheel is attached proximate to the back right side of the frame;

a third set of laterally spaced foot stand wheels comprising a left foot stand wheel and a right foot stand wheel in back of the second set of laterally spaced wheels;

a steering control mechanism connected with the back left vertical frame member and the back right vertical frame member, wherein the steering control mechanism transmits steering input to the drive wheels to steer the riding device via at least one motor;

a hand grip is connected with the back left vertical frame member and the back right vertical frame member;

a foot stand assembly securely connected with the back end of the frame;

the foot stand assembly comprising a foot stand platform and the foot stand wheels;

wherein the foot stand platform is suspended above a riding surface and aligned with the load bearing horizontal platform while supporting the weight of a human; and wherein the left foot stand wheel is positioned proximate to a left side of the foot stand platform and the right foot stand wheel is positioned proximate to a right side of the foot stand platform;

a power source connected with two motors wherein a first motor is connected with the left drive wheel and a second motor is connected with the right drive wheel, wherein in response to steering input transmitted from the steering control mechanism at least one motor transmits force to rotate the connected drive wheel to move and steer the riding device.

2. The riding device of claim 1 wherein steering input is transmitted from the steering control mechanism via the at least one motor by connection wires.

3. The riding device of claim 1 wherein steering input is transmitted from the steering control mechanism via the at least one motor by a wireless connection.

4. The riding device of claim 1 wherein the at least one motor mechanically transmits force to rotate at least one drive wheel to move and steer the riding device.

5. The riding device of claim 1 wherein the power source is a battery.

6. The riding device of claim 1 wherein the foot stand assembly is securely connected with the back end of the frame through at least one set of extensions.

7. The riding device of claim 1 wherein the third set of laterally spaced wheels are swivel caster wheels.

8. The riding device of claim 1 wherein the third set of laterally spaced wheels are non-swivel wheels.

9. The riding device of claim 1 wherein the riding device has a width that fits through a standard internal doorway.

10. The riding device of claim 1 wherein a tool box having drawers, wherein the tool box is integrated with the load bearing horizontal platform and the each vertical frame member such that the at least one solid vertical wall forms a vertical wall of the tool box.

11. The riding device of claim 1 wherein the frame further comprises frame structures that support additional items.

12. The riding device of claim 1 wherein each vertical frame member extends from the rectangular frame base at 90 degree angles such that each vertical frame member is perpendicular to the rectangular frame base.

13. A riding device for transporting loads and a human comprising:

a frame comprised of a front end member, a back end member, a left side member, and a right side member connected at 90 degree angles to form a rectangular frame base;

a load bearing horizontal rectangular platform integrated with or supported via the rectangular frame base; wherein the frame further comprises a front left vertical frame member, a front right vertical frame member, a back left vertical frame member, and a back right vertical frame member, wherein each vertical frame member extending from corners of the rectangular frame base;

a first set of laterally spaced swivel caster wheels connected with the front end of the frame, wherein a left caster wheel is attached proximate to the front left side of the frame and a right caster wheel is attached proximate to the front right side of the frame;

a second set of laterally spaced drive wheels connected with the back end of the frame, wherein a left drive wheel is attached proximate to the back left side of the frame and a right drive wheel is attached proximate to the back right side of the frame;

a third set of laterally spaced foot stand wheels comprising a left foot stand wheel and a right foot stand wheel in back of the second set of laterally spaced wheels;

a steering control mechanism connected with the back left vertical frame member and the back right vertical frame member, wherein the steering control mechanism transmits steering input to the drive wheels to steer the riding device via at least one motor;

a hand grip is connected with the back left vertical frame member and the back right vertical frame member;

a tool box having drawers, wherein the tool box is integrated with the load bearing horizontal rectangular platform, the rectangular frame base, and the each vertical frame member;

a foot stand assembly securely connected with the back end of the frame;

the foot stand assembly comprising a foot stand platform and the foot stand wheels;

wherein the foot stand platform is suspended above a riding surface and aligned with the load bearing horizontal platform while supporting the weight of a human; and wherein the left foot stand wheel is positioned proximate to a left side of the foot stand platform and the right foot stand wheel is positioned proximate to a right side of the foot stand platform;

a power source connected with two motors wherein a first motor is connected with the left drive wheel and a second motor is connected with the right drive wheel, wherein in response to steering input transmitted from the steering control mechanism at least one motor transmits force to rotate the connected drive wheel to move and steer the riding device.

* * * * *